Nov. 2, 1965        P. H. MILLER, JR            3,214,976
                TEMPERATURE MEASURING APPARATUS
                     Filed Oct. 28, 1960
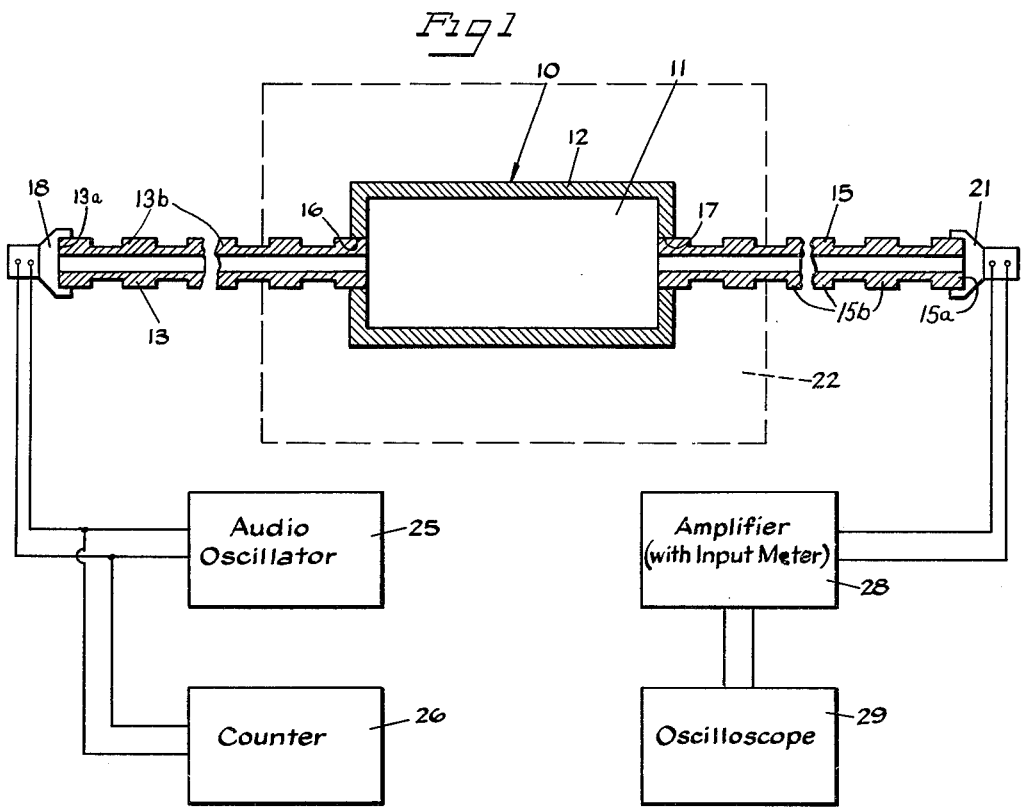
Inventor
Park H. Miller, Jr.

3,214,976
TEMPERATURE MEASURING APPARATUS
Park H. Miller, Jr., Del Mar, Calif., assignor to General Dynamics Corporation, New York, N.Y., a corporation of Delaware
Filed Oct. 28, 1960, Ser. No. 65,694
4 Claims. (Cl. 73—339)

This invention relates to temperature measuring apparatus and more particularly to an acoustical thermometer which is capable of measuring high temperatures.

In the past, accurate measurements of extremely high temperatures have required the use of rather complex apparatus. Various less complex devices, such as thermocouples, pyrometers and numerous liquid-in-bulb thermometers, while suitable for measurements over a range of moderate temperatures, have proven incapable of measuring temperatures in excess of 1500° K. The devices presently being used for the measurement of high temperatures are generally constructed of materials which are extremely susceptible to and adversely affected by chemical activity, diffusion, nuclear radiation induced transformations and the like. Therefore the measurements accomplished thereby are often sufficiently inaccurate so that corrections thereof or additional measurements are required. Moreover, devices which are adapted to effect measurements at high temperatures are generally incapable of measuring extremely low temperatures, e.g., temperatures below the dew point of hydrogen or below approximately 20° K.

Accordingly, it is a prime object of the present invention to provide a new and improved temperature measuring apparatus.

Another object of the invention is the provision of an acoustical thermometer which is capable of accurately measuring temperatures over a range of approximately 20 to 2000° K.

A further object of the invention is to provide an acoustical thermometer that is substantially unaffected by adverse environmental conditions resulting from radiation and the like.

A more specific object of the invention is the provision of an acoustical thermometer wherein a condition of acoustic resonance is utilized in the measurement of high temperatures.

Still another object of the invention is to provide an acoustical thermometer which may be constructed of readily available materials and which is suitably proportioned for use in reactors, furnaces and other devices wherein high temperatures are developed.

An additional object of the invention is the provision of an acoustical thermometer wherein the means for determining a condition of acoustic resonance can be operated at room temperature or other convenient temperature while the resonant chamber is maintained at the temperature of interest.

Other objects and advantages of the present invention will become apparent from the following detailed description when considered in conjunction with the accompanying drawing:

In the drawings there is illustrated diagrammatically an acoustical thermometer embodying the principal features of the present invention.

As illustrated, a preferred embodiment of the present invention includes an acoustical resonator which consists of a cavity-defining enclosure that is provided with a pair of apertures at opposite extremities thereof. The cavity defined by the enclosure is filled with a suitable gas which is induced to oscillate in a longitudinal resonant mode by an audio signal that is transmitted to and through the cavity from a coupling tube mounted within one of the apertured end portions of the enclosure. The signal transmitted through the cavity is passed by another of the coupling tubes, which is mounted in the same or oppositely disposed apertured end portions of the enclosure, to a suitable measuring device that records the amplitude of the signal as a function of frequency. When the frequency of the audio signal transmitted through the cavity is such that a condition of acoustic resonance is established therein, a maximum signal will be recorded by the measuring device. This value of frequency which establishes the resonant condition within the cavity is utilized to determine the temperature of the gas therein from a relationship which expresses the temperature of the gas as a function of the frequency of the applied audio signal.

This relationship, which is utilized to determine the temperature of the gas within the cavity, is derived from several well known equations which relate various parameters of a gaseous medium such as the temperature of the gaseous medium and the velocity of sound therein. For example, it is well established that the velocity of sound in a gaseous medium is related to the temperature of the medium by the following equation:

$$V = \sqrt{\frac{\gamma R T}{M}} \quad (1)$$

wherein:

$V$ = velocity of sound within the gaseous medium
$\gamma$ = the ratio of the specific heats $c_p/c_v$ of the gaseous medium
$c_p$ = specific heat of the gas at constant pressure
$c_v$ = specific heat of the gas at constant volume
$R$ = the gas constant
$T$ = temperature of the gaseous medium in absolute units
$M$ = molecular weight of the gaseous medium.

Similarly, it is well known that the velocity of sound in a gas-filled chamber is related to the frequency of vibration of the gaseous column confined therein by the following equation:

$$f = \frac{nV}{2L} \quad (2)$$

wherein:

$f$ = frequency of vibration of the gaseous column
$n$ = number of loops formed by vibration within the gas-filled chamber
$L$ = effective chamber length wherein the gaseous medium is confined
$V$ = velocity of sound in the gas-filled chamber.

Therefore, combining Equations 1 and 2, it is apparent that the temperature of the gaseous medium within the chamber is related to the frequency of vibration of the gaseous column squared by the following equation:

$$T = \left(\frac{4L^2M}{n^2R}\right)f^2$$

For practical purposes the factors expressed in Equation 3, other than frequency, are substantially constant. Accordingly, the temperature (T) of the gaseous medium can be expressed as a function of the frequency of vibration squared times a constant:

More particularly, the ratio of the specific heats ($\gamma$) of a gaseous medium, the gas constant (R) and the molecular weight (M) of the gaseous medium remain substantially constant over a given temperature range. Moreover, the effective chamber length (L) wherein the gaseous medium is confined may be considered to be a constant value, as can the number of loops ($n$) which are formed by the vibrations generated within the chamber.

A preferred form of acoustical thermometer, which is capable of measuring temperatures above 2000° K. in accordance with the principles outlined above, includes a cylindrical acoustical resonator 10 which provides a hollow inner chamber or cavity 11. A pair of coupling tubes 13 and 15 are mounted by suitable gas-tight fittings (not shown) within apertures 16 and 17 formed in the longitudinal extremities of an enclosure 12 which defines the cylindrical cavity 11.

The coupling tube 13 functions to transmit an audio signal through the acoustical resonator and to the coupling tube 15. The transmitted audio signal emanates from a transducer 18 mounted at the inlet extremity 13a of the coupling tube 13. A second transducer 21 mounted at the outlet extremity 15a of the coupling tube 15 receives the audio signal transmitted by the transducer 18 through the acoustical cavity 11. Each of the transducers 18 and 21 are mounted over the inlet and outlet extremities 13a and 15a of the coupling tubes 13 and 15, respectively, so that the coupling tubes as well as the acoustical cavity 11 are gas-tight. In a preferred embodiment of the invention, the acoustical cavity 11 and, accordingly, the coupling tubes 13 and 15 are filled with an inert gas such as argon.

The acoustical resonator 10 and associated coupling tubes 13 and 15 are so proportioned that a substantial portion of the entire apparatus may be readily disposed within a furnace or reactor, a representation of which is generally designated by the numeral 22 in the accompanying drawing. The coupling tubes 13 and 15, as illustrated, are sufficiently long so that the outer extremities thereof extend from the furnace or reactor wherein the acoustical resonator is disposed.

Accordingly, the transducers 18 and 21 are suitably insulated from the high temperatures which are developed in the furnace wherein the resonator is disposed. As further illustrated, the outer diameter of each of the coupling tubes 13 and 15 periodically varies in a uniform fashion such as to provide a plurality of impedance discontinuities 13b and 15b so that no resonant condition can be established in the wall material of the coupling tubes themselves during the transmittal of an audio signal therethrough.

The audio signal transmitted by the transducer 18 through the gas-filled acoustical cavity 11 is derived from a variable frequency audio oscillator 25. As illustrated, a counter 26 is connected across the output terminals of the audio oscillator and functions to accurately measure the frequency of the audio signal transmitted thereby. The sound reproducing transducer 21 which receives the audio signal transmitted through the acoustical cavity 11 by the transducer 18 is electrically connected to an audio amplifier 28. The audio signal received by the transducer 21 is amplified and the output signal derived from the amplifier is fed to an oscilloscope or other suitable measuring device 29.

In operation, the acoustical resonator 10 is positioned within a furnace or reactor wherein high temperature measurements are to be made. The output of the audio oscillator is adjusted so that the frequency of the audio signal transmitted through the coupling tube 13 and the acoustical cavity 11 of the resonator establishes a resonant condition therein. Acoustic resonance may be said to occur within the cavity 11 when the acoustic impedance becomes a minimum and the velocity of the audio signal passing through the inert gas contained therein is maximum. More succinctly, acoustical resonance may be defined as maximum response to a given acoustic pressure at a particular frequency.

As the frequency of the audio oscillator is varied until a resonant condition is established within the cavity 11, the signal received by the transducer 21 is amplified and the magnitude of this signal is measured and/or observed with the device 29. A condition of acoustical resonance within the cavity 11 will be apparent from the magnitude of the output signal inasmuch as this output signal will peak or reach a maximum value at resonance. When peak or maximum output is measured and observed, the frequency of the audio oscillator as indicated by the counter 26 is recorded. This value of frequency as well as the value of the other parameters included in the proportionally constant K, which are determined in a conventional manner, are then utilized to deduce the temperature (T) of the gas within the cavity from the relationship expressed in Equation 4. The sharpness of the peak or maximum output signal will depend upon several factors, namely, the length and diameter of the acoustical resonator, the size of the coupling tubes, the static pressure and temperature of the gaseous medium therein and the kind of gas used.

From the foregoing description, it is apparent that the present invention provides an improved apparatus for measuring high temperatures. It should be understood, however, that the above described structural features of the acoustical thermometer are simply illustrative of the application of the invention. Numerous other arrangements may be readily devised by those skilled in the art which would embody the principles of the invention and fall within the spirit and scope thereof. For example, the location and structural features of the coupling tubes could be suitably altered without affecting the fundamental operation of the device.

Another possible modification of the invention which would be apparent to the skilled artisan would be to establish a feedback system whereby the output signal received by the second transducer could be fed through a high gain audio amplifier to the first transducer and thereby render the acoustical thermometer self oscillating.

Although a preferred embodiment of the acoustical thermometer has been described in connection with high temperature measurements, it is obvious that other characteristics of a gaseous medium contained within an acoustic enclosure of the type described (i.e., density and pressure) can be readily measured.

Various other changes and modifications may be devised without deviating from the spirit and scope of the invention as set forth in the accompanying claims.

What is claimed is:

1. A temperature measuring apparatus for measuring the temperature within a zone which apparatus comprises, an enclosed gas filled acoustical resonator, a first elongated coupling tube having one extremity thereof connected to said resonator, a first transducer secured to said first coupling tube at the other extremity thereof for transmitting an audio signal through said acoustical resonator, a second elongated coupling tube having one extremity thereof connected to said resonator in spaced relation to said first coupling tube, a second transducer secured to said second coupling tube at the other extremity thereof for receiving the signal transmitted through said acoustical resonator and for producing an electrical signal related thereto, said coupling tubes being substantially smaller in cross-section than said resonator and being of sufficient length to extend beyond said zone, means selectively varying the frequency of the audio signal transmitted through said acoustical resonator until the gas therein is induced to oscillate in a resonant mode, the resonant oscillation of the gas being manifested as a maximum signal produced by said second transducer, and means measuring the frequency of said audio signal at which a resonant condition is induced in the gas so that the temperature thereof can be determined, the temperature of the gas bearing on the measured value of the frequency in accordance with the following relationship:

$$T = Kf^2$$

wherein:

$T$ = temperature of the gas maintained within said resonator $K$ = a proportionally constant having a value determined from the physical characteristics of both the gas and the acoustical resonator $f$ = measured value of frequency of the audio signal at which the resonant condition is induced in the gas.

2. A temperature measuring apparatus for measuring the temperature within a zone, which apparatus comprises a gas-tight, gas filled acoustical resonator, a first elongated coupling tube having one extremity thereof connected in gas-tight relation to said resonator, a first transducer secured in gas-tight relation to said first coupling tube at the other extremity thereof for transmitting an audio signal through said acoustical resonator, a second elongated coupling tube having one extremity thereof connected in gas-tight relation to said resonator in spaced relation to said first coupling tube, a second transducer secured in gas-tight relation to said second coupling tube at the other extremity thereof for receiving the signal transmitted through said acoustical resonator and for producing an electrical signal related thereto, said coupling tubes being substantially smaller in cross-section than said resonator and being of sufficient length to extend beyond said zone, means selectively varying the frequency of the audio signal transmitted through said acoustical resonator until the gas therein is induced to oscillate in a resonant mode, the resonant oscillation of the gas being manifested as a maximum signal produced by said second transducer, and means measuring the frequency of said audio signal at which a resonant condition is induced in the gas so that the temperature thereof can be determined, the temperature of the gas bearing on the measured value of the frequency in accordance with the following relationship:

$$T = Kf^2$$

wherein:

$T$ = temperature of the gas maintained within said resonator $K$ = a proportionally constant having a value determined from the physical characteristics of both the gas and the acoustical resonator $f$ = measured value of frequency of the audio signal at which the resonant condition is induced in the gas.

3. A temperature measuring apparatus for measuring the temperature within an enclosure which apparatus comprises a gas filled, gas-tight acoustical resonator, a first elongated coupling tube having one extremity thereof connected in gas-tight relation to said resonator, a first transducer secured in gas-tight relation to said first elongated coupling tube at the other extremity thereof for transmitting an audio signal through said acoustical gas filled resonator, a second elongated coupling tube having one extremity thereof connected in gas-tight relation to said resonator in spaced relation to said first elongated coupling tube, a second transducer secured in gas-tight relation to said second coupling tube at the other extremity thereof for receiving the audio signal transmitted through said acoustical resonator and for producing an electrical signal related thereto, said coupling tubes being substantially smaller in cross-section than said resonator and being of sufficient length to extend beyond said enclosure, means selectively varying the frequency of the audio signal transmitted through said gas-filled acoustical resonator within a predetermined range of frequencies until the gas therein is induced to oscillate in a longitudinal resonant mode, the resonant condition of the gas being manifested as a maximum signal produced by said second transducer, said first and second elongated coupling tubes having the outer diameters thereof proportioned so that a resonant condition is precluded from being established therein within said predetermined range of frequencies transmitted through said gas, and means measuring the frequency of the audio signal at which a resonant condition is induced within the gas so that the temperature thereof can be determined, the temperature of the gas bearing on the measured value of the frequency in accordance with the following relationship:

$$T = Kf^2$$

wherein:

$T$ = temperature of the gas maintained within said resonator $K$ = a proportionally constant having a value determined from the physical characteristics of both the gas and the acoustical resonator $f$ = measured value of frequency of the audio signal at which the resonant condition is induced in the gas.

4. A temperature measuring apparatus for measuring the temperature within an enclosure which apparatus comprises a gas filled, gas-tight acoustical resonator, a first coupling tube having one extremity thereof connected in gas-tight relation to said resonator, a first transducer secured in gas-tight relation to said first coupling tube at the other extremity thereof for transmitting an audio signal through said acoustical resonator, a second coupling tube having one extremity thereof connected in gas-tight relation to said resonator in spaced relation to said first coupling tube, a second transducer secured in gas-tight relation to said second coupling tube at the other extremity thereof for receiving the signal transmitted through said acoustical resonator and for producing an electrical signal proportional thereto, said coupling tubes being substantially smaller in cross-sectional area than said resonator and being of sufficient length to extend beyond said enclosure, means connected to said first transducer selectively varying the frequency of the audio signal transmitted through said acoustical resonator within a predetermined range of frequencies until the gas therein is induced to oscillate in a resonant mode, the resonant oscillation of the gas being manifested as a maximum signal produced by said second transducer, said first and second coupling tubes having the walls thereof provided with a plurality of impedance discontinuities so that a resonant condition is precluded from being established therein within said predetermined range of frequencies transmitted through said gas, and means connected to said second transducer measuring the frequency of said audio signal at which a resonant condition is induced in the gas so that the temperature thereof can be determined, the temperature of the gas bearing on the measured value of the frequency in accordance with the following relationship:

$$T = Kf^2$$

wherein:

$T$ = temperature of the gas maintained within said resonator $K$ = a proportionally constant having a value determined from the physical characteristics of both the gas and the acoustical resonator $f$=measured value of frequency of the audio signal at which the resonant condition is induced in the gas.

References Cited by the Examiner

UNITED STATES PATENTS

| | | | |
|---|---|---|---|
| 2,283,750 | 5/42 | Mikelson | 181—0.5 |
| 2,571,979 | 10/51 | Webster | 181—0.5 |
| 2,576,423 | 11/51 | Stewart | 181—0.5 |
| 2,582,232 | 1/52 | Cesaro et al. | 181—0.5 |
| 2,716,887 | 9/55 | Smith | 181—0.5 |
| 2,762,985 | 9/56 | George | 333—7 |

FOREIGN PATENTS 404,809  10/24  Germany.

OTHER REFERENCES

Adler, R.: Compact Electro Mechanical Filter in Electronics, pages 100–105, April 1947.

ISAAC LISANN, *Primary Examiner.*

C. W. ROBINSON, *Examiner.*

UNITED STATES PATENT OFFICE
CERTIFICATE OF CORRECTION

Patent No. 3,214,976　　　　　　　　　　　　November 2, 1965

Park H. Miller, Jr.

It is hereby certified that error appears in the above numbered patent requiring correction and that the said Letters Patent should read as corrected below.

Column 3, lines 3 to 5, the equation should appear as shown below instead of as in the patent:

$$T = \left(\frac{4L^2 M}{n^2 \gamma R}\right) f^2 \qquad (3)$$

same column 3, after line 10, insert the equation $$T = K f^2 \qquad (4)$$

Signed and sealed this 6th day of December 1966.

(SEAL)
Attest:

ERNEST W. SWIDER
Attesting Officer

EDWARD J. BRENNER
Commissioner of Patents